Mar. 5, 1929.  J. W. GREER  1,703,881
CONVEYER
Filed Feb. 28, 1927   3 Sheets-Sheet 1

INVENTOR:
Jesse W. Greer
Robt. R. Harris
ATTORNEY

Mar. 5, 1929.　　　J. W. GREER　　　1,703,881
CONVEYER
Filed Feb. 28, 1927　　3 Sheets-Sheet 2

Mar. 5, 1929.  J. W. GREER  1,703,881
CONVEYER
Filed Feb. 28, 1927   3 Sheets-Sheet 3
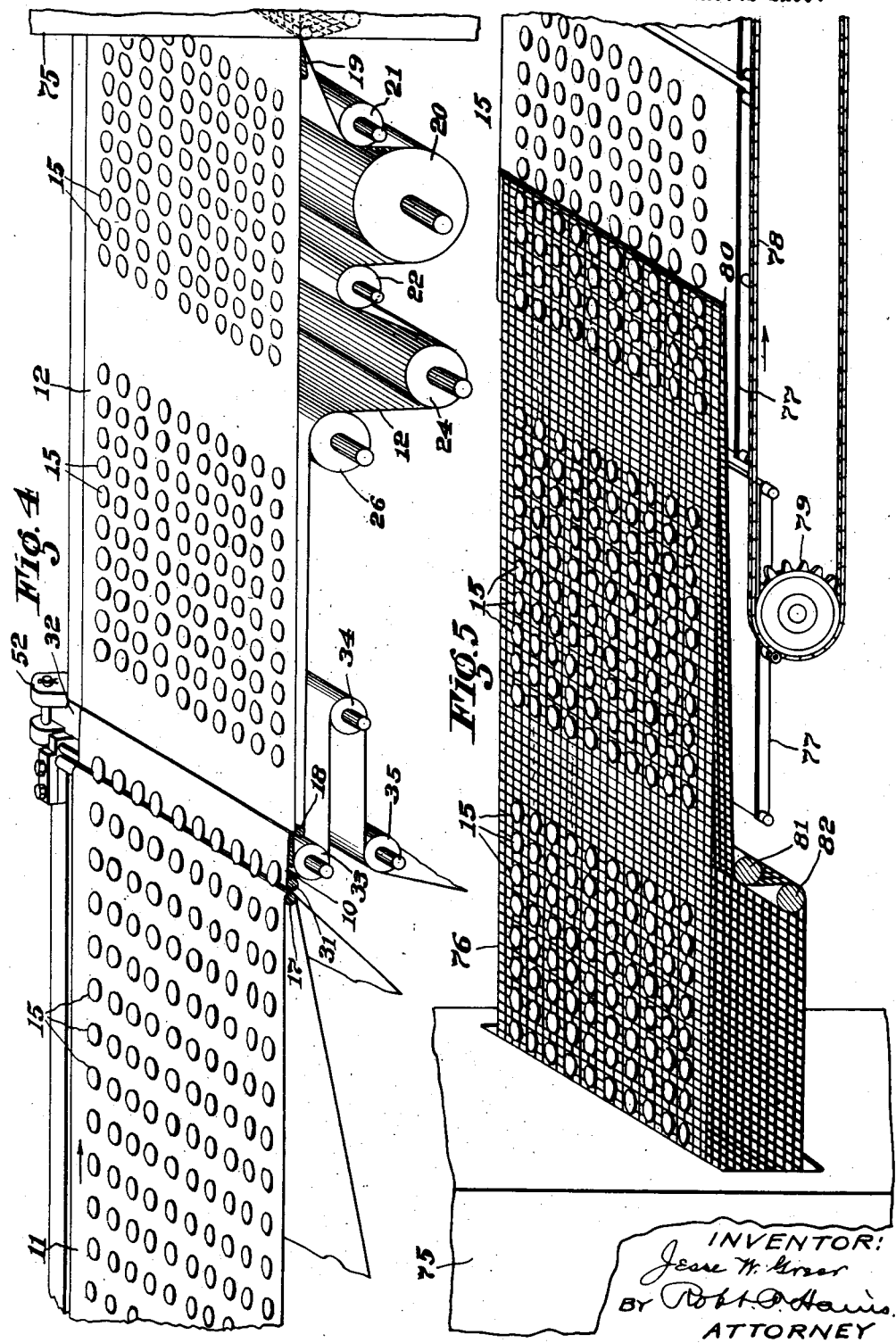

Patented Mar. 5, 1929.

1,703,881

UNITED STATES PATENT OFFICE.

JESSE W. GREER, OF CAMBRIDGE, MASSACHUSETTS.

CONVEYER.

Application filed February 28, 1927. Serial No. 171,475.

This invention relates to conveyers for confections and more particularly to bunching and spacing mechanism adapted to be associated with the conveyers.

In the manufacture of confections endless conveyer aprons or belts are employed to convey the confections through depositing and coating machines, but it is usually desirable to employ a tray conveyer rather than a belt to advance the confections through the cooling chamber. This is due to the fact that the confections should remain a substantial length of time in the cooling chamber, and if a tray conveyer is employed different portions of the same may be advanced back and forth along different runs so that a long conveyer may be enclosed in a comparatively small cooling chamber, whereas if a belt conveyer is employed the loaded portion of the same cannot be advanced back and forth along different runs, with the result that an excessively long cooling chamber is required.

When a tray conveyer is employed care must be exercised in delivering the confections to the trays so that the confections will not enter the spaces between the adjacent trays, because if the confections enter these spaces they will be crushed and will become smeared over the operating parts of the machine to clog the same.

The problem of placing the confections properly upon the trays has given considerable difficulty heretofore, because the confections are fed to the trays by a traveling belt or apron, and if the confections are placed upon the belt sufficiently far apart to accommodate the space between adjacent trays then a relatively few confections will be placed upon each tray and the cooling machine will be operated far below its maximum capacity.

In order to place the confections close together upon the traveling trays and at the same time prevent confections from being delivered between the trays, it has been customary heretofore to station an attendant near the point where the confections are delivered to the trays so that he may stop the confection-advancing belt momentarily as each tray passes out from its loading position.

This method of loading the trays is open to the objection that the frequent starting and stopping of the conveying mechanism wastes time and wears the machine out rapidly. Furthermore, it requires the constant attention of a machine attendant, and if he fails to stop the feeding mechanism at just the right moment each time a tray is filled the confections will enter between the trays and clog the machine.

Having the foregoing in mind the present invention relates to bunching and spacing mechanism which is adapted to be operated in timed relation with the traveling trays so that the confections are automatically arranged in groups separated by spaces, to conform to the size and shape of the trays upon which the confections are to be deposited.

An important feature of the present invention resides in a transferrer for transferring the confections from one conveyer to another and which is constructed to be advanced slowly along one of the conveyers while it delivers the desired number of confections thereto and is then moved rapidly in the opposite direction to form a space between successive groups of the confections. The operation of the transferrer is such that the confections delivered thereby may be bunched together as close as desired while the successive groups of the confections are spaced apart sufficiently to prevent the confections from entering the space between adjacent trays.

Another feature pf the invention resides in the construction of the transferrer and in means for actuating the same.

Another feature of the invention resides in mechanism for maintaining a constant tension upon the transferring apron.

Other features of the invention and novel combination of parts in addition to the above will be hereinafter described in connection with the accompanying drawings which illustrate one good practical form of the invention.

In the drawings—

Figure 1:
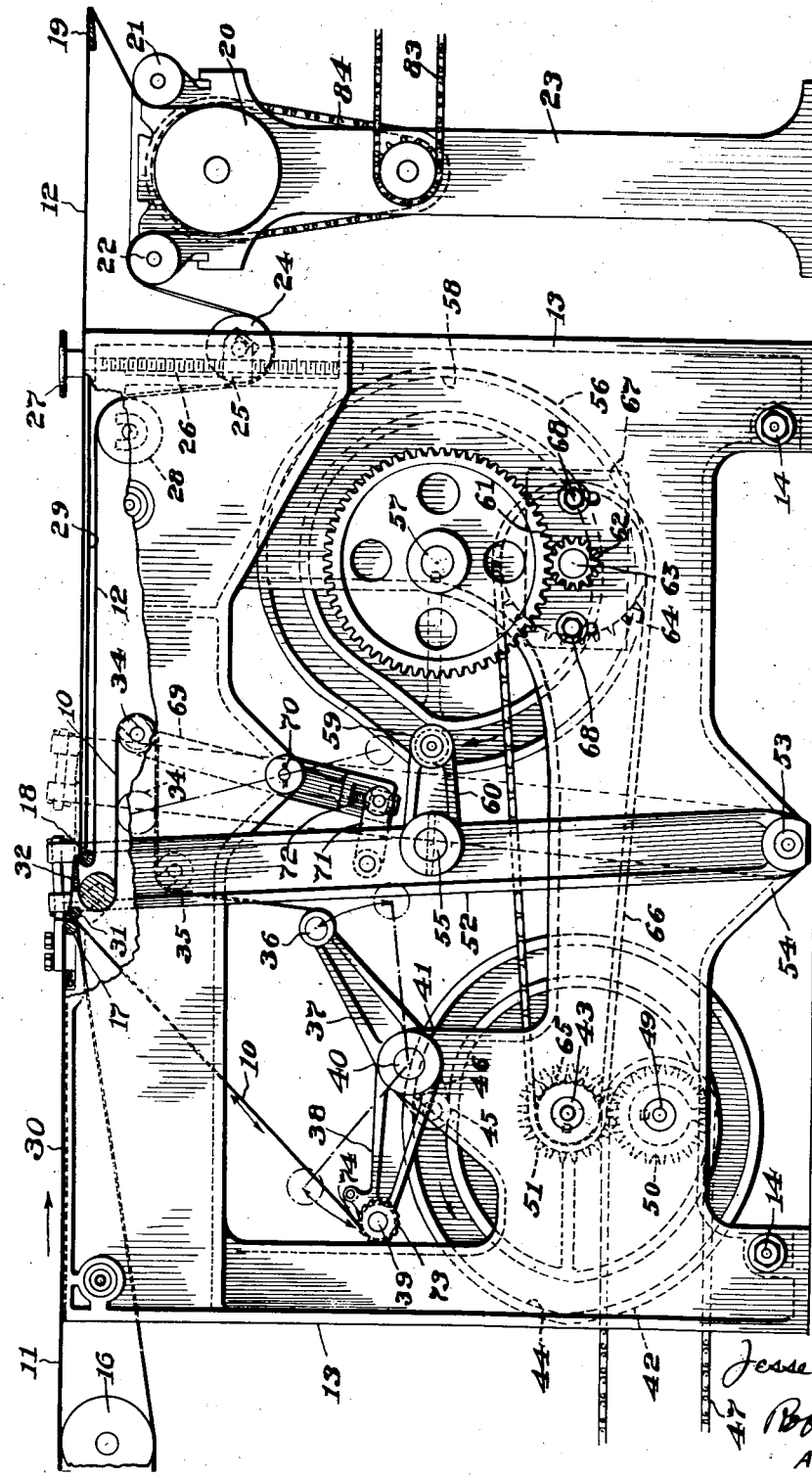
Fig. 1 is a side elevation with parts in section of bunching and spacing mechanism constructed in accordance with the present invention.
Figure 2:
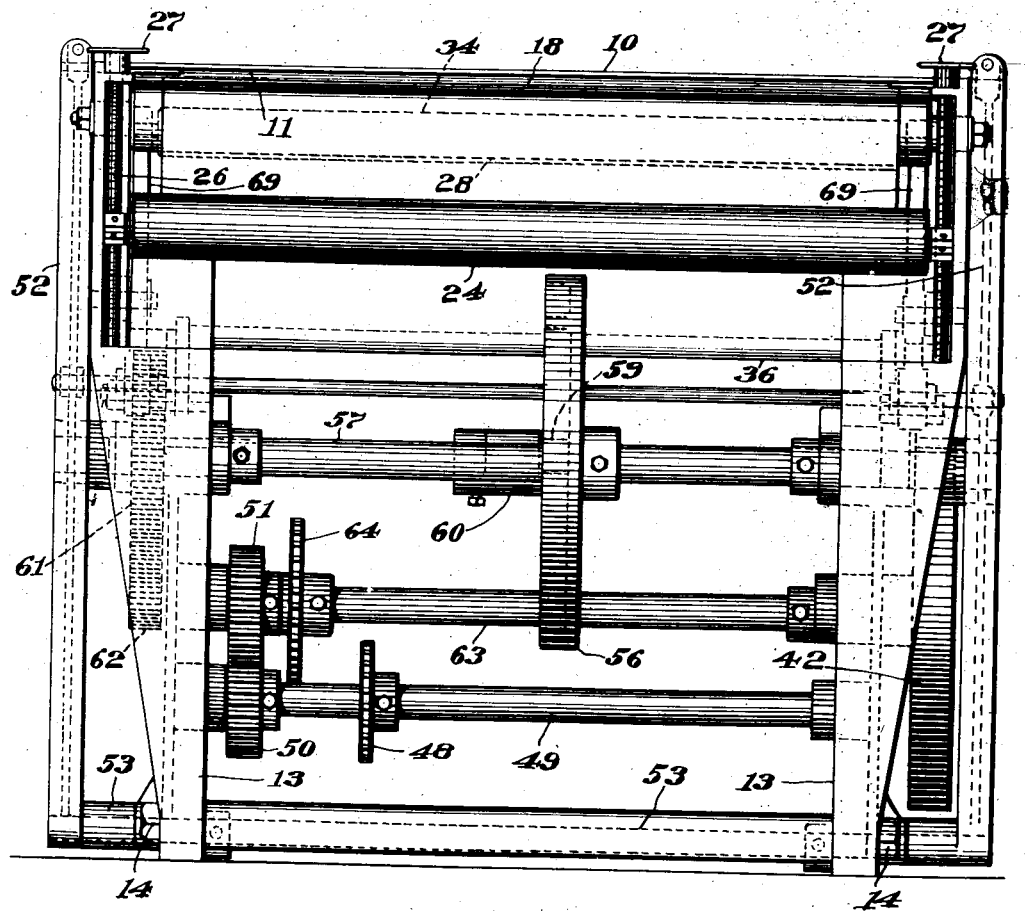
Fig. 2 is a right-hand view of the bunching and spacing mechanism of Fig. 1.
Figure 3:
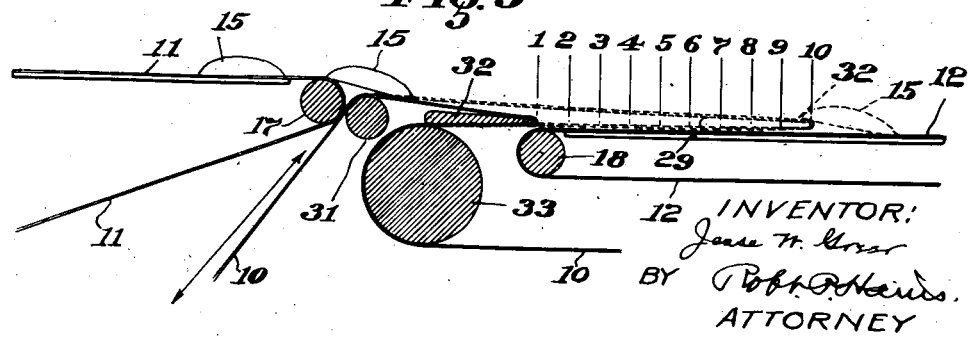

Fig. 3 on an enlarged scale is a vertical sectional view through the transferring apron and associated parts of Fig. 1, the apron being shown in full lines in its retracted position and dotted lines in its extended position.

Fig. 4 is a perspective view showing the transferring mechanism located between a pair of conveyer belts; and Fig. 5 is a continuation of Fig. 4 showing mechanism for delivering the spaced groups of confections to the traveling trays.

The bunching and spacing mechanism forming the subject matter of the present invention is designed primarily for use in confectionery machines where it is necessary to handle the cake, candies and other confections carefully in order not to break or mar them, but it obviously may be employed to bunch and space various articles.

Any well known form of mechanism may be employed to deposit the confections upon the trays after they have been grouped and spaced in accordance with the present invention and one form of tray loading mechanism which may be employed to this end is disclosed and claimed in the J. W. Greer Patent No. 1,571,052, granted January 26, 1926.

In the embodiment of the invention shown the transferring apron 10 is positioned between a depositor belt 11 and an intermediate belt 12. It will be apparent, however, that the transferring mechanism forming the subject matter of the present invention may be associated with any pair of conveyer belts.

The transferring or rocker apron 10 and the supporting and operating mechanism for the same is shown as mounted within a casing having the side frames 13 which may be made of cast iron, and these side frames are secured in spaced relation to each other by the transversely extending tie rods 14. The transferring mechanism of the present invention and its supporting frame preferably are so constructed that this mechanism may be readily associated with the conveyer belts now in use in various confectionery manufacturing plants without requiring the conveyer belts previously employed to be discarded.

In the embodiment of the invention illustrated it is assumed that the depositor belt 11 is the belt employed to advance cakes or other confections through a depositor in which a coating or deposit is placed upon each confection. The confections 15 upon the conveyer belt 11 are advanced by this conveyer in a right-hand direction viewing Fig. 1, as indicated by the arrow, and an intermediate portion of the belt 11 is supported by the roller 16 while the discharging end portion of this belt passes around a small roller 17 which is rotatably supported by the side frames 13. The depositor belt 11 is usually advanced by a step-by-step movement through mechanism not shown, but it will be understood that the bunching and spacing mechanism of the present invention may receive its confections from a continuously moving belt as well as from one that receives a step-by-step movement.

The intermediate belt 12 is shown as supported at the left-hand end of its upper run by a small roller 18 and at its right-hand end by a knife blade or bar 19. This belt may be driven by the roller 20 adjacent which are mounted the idle rollers 21 and 22 adapted to hold the belt 12 in contact with a substantial portion of the surface of the driving roller 20 to prevent slippage between this roller and the belt which it drives. The rollers 20, 21 and 22 are shown as rotatably supported by the columns 23 mounted in spaced relation to the supporting frames 13. The conveyer belt 12 may be tensioned as desired by raising and lowering the tensioning roller 24 the opposite ends of which are journaled in sliding blocks 25 which may be raised and lowered by rotating the adjusting screws 26 the upper ends of which are provided with the hand wheels 27. The tension roller 24 is shown as positioned between the idler roller 22 and a belt supporting roller 28 which is supported by the side frames 13. In order to keep the upper run of the belt 12 from sagging under the weight of the confections placed thereupon the supporting plate 29 is provided which may be formed of sheet metal and the upper surface of which is made smooth so that the belt will readily slide along this plate. The plate 29 is supported by the side frames 13. The upper run of the depositor belt 11 may be likewise supported by the plate 30.

As above pointed out the present invention is directed to means for transferring confections or the like from one conveyer upon which they are uniformly spaced to a second conveyer, and to arrange them upon the second conveyer in spaced groups. The transferring or rocking apron 10 is employed to accomplish this result and the manner in which this apron is supported and operated will now be described. The active or confectionery conveying portion of the apron 10 is supported by the roller 31 and by the knife blade or bar 32. The roller 31 is mounted adjacent to but slightly below the roller 17, as best shown in Fig. 3, and the bar 32 is mounted for sliding movement along the upper run of the intermediate belt 12, as will be apparent from Fig. 3, wherein this bar is shown in full lines in the position it occupies when at the end of its stroke in a left-hand direction, and the position this bar occupies when at the end of its stroke in a right-hand direction is indicated in dotted lines. The apron 10, as will be apparent from Fig. 3, is bent sharply around the front edge of the knife blade 32 and is led back around the supporting roller 33. The apron passes from the lower side of the roller 33 to a take-up roller 34 and then around a supporting roller 35, and one end of this apron, in the construction shown, is secured to the transversely extending bar 36 of a rocking frame having the rocking arms 37 and 38. The opposite end of the apron 10 extends downwardly from the roller 31 to a take-up roller 39 supported by the arms 38 of the rocking frame just mentioned. This frame is supported for rocking movement by the transversely extending shaft 40 the ends of which are mounted in the bearings 41 provided upon the side frames 13.

In the embodiment of the invention illustrated the transferring apron 10 is moved back and forth with a reciprocatory movement to cause it to transfer the confections 15 from the belt 11 to the belt 12. This reciprocatory movement is imparted to the apron 10 by rocking the arms 37, 38 from the position in which they are shown in full lines in Fig. 1 to their dotted line position in this figure. This rocking movement is imparted to the levers 37 by the grooved cam 42 which is rigidly secured to the transversely extending shaft 43. The cam is provided with the eccentric groove 44 adapted to receive a roller 45 which is carried by an arm 46 that is rigidly secured to the central shaft 40 of the rocking frame just mentioned. The cam wheel 42 is driven from the depositor in timed relation with the depositor belt 11 by a chain 47 that passes around the sprocket 48 which is rigidly secured to the transversely extending shaft 49. Rotative movement is imparted from the shaft 49 to the shaft 43, but in an opposite direction, by the cooperating gears 50, 51, which are rigidly secured to their respective shafts.

The mechanism so far described will serve to transfer the successive rows of the confections 15 from the belt 11 to the belt 12, but in order to arrange the confections in spaced groups upon the belt 12 it is necessary to advance the knife blade 32 slowly along its path of travel in a right-hand direction over the upper run of the belt 12. This will cause each row of the confections 15 deposited upon the reciprocating apron 10 to be carried a greater distance along the belt 12 than the preceding row of confections conveyed by the apron 10, with the result that the rows of confections 15 are placed closer together upon the belt 12 than they are upon the belt 11, as will be apparent from Fig. 4. The slow progressive movement is imparted to the knife blade 32 in a right-hand direction until the desired number of rows of confections have been deposited upon the belt 12, whereupon this knife blade and its apron are quickly retracted to the position in which they are shown in full lines in Fig. 3, thus forming the space or gap between successive groups of confections placed upon the belt 12.

The reciprocatory movement of the knife blade 32 is imparted thereto by the rocking levers 52 which are disposed at the opposite sides of the supporting frame, and the lower ends of these levers are rigidly secured to the transversely extending shaft 53 which shaft is journaled in the downwardly extending portions 54 of the supporting frames 13. The rocking levers 52 are connected intermediate their ends by the transversely extending bar 55, and rocking movement is imparted to these levers by the grooved cam 56 that is rigidly secured to the transversely extending shaft 57. The cam 56 has the cam groove 58 adapted to receive the roller 59 which is rotatably mounted upon an arm 60 which arm is secured to an intermediate portion of the transversely extending bar 55. The cam wheel 56 is driven at a much slower speed than the cam wheel 42, since the latter serves to reciprocate the apron 10 each time a row of confections is transferred from the belt 11 to the belt 12, whereas the cam wheel 56 makes one complete revolution for each entire group of confections which are transferred to the belt 12. The driving means shown for the cam wheel 56 consists of a gear 61 rigidly secured to the shaft 57 and which meshes with a pinion 62 secured to the transversely extending shaft 63. The shaft 63 is provided with a sprocket 64 which is driven from the sprocket 65 by the chain 66.

The upper end of each lever 52 is slotted or bifurcated as shown, and is adapted to slidably receive a block provided at each end of the knife blade 32, the arrangement being such that as the levers 52 are reciprocated the opposite ends of the knife blade 52 will slide along horizontal bearings supported by the side frames 13.

The construction of the groove 58 of the cam wheel 56 is such that when this cam wheel is rotated in the direction indicated by the arrow, the levers 52 will be slowly rocked in a right-hand direction, viewing Fig. 1. This will slowly advance the knife blade along the upper run of the belt 12 to the successive positions indicated by dotted lines in Fig. 3, and designated by the numerals 1 to 10 inclusive, it being assumed that in the construction shown ten rows of confections 15 form a spaced group. It will be understood that the number of rows of confections in a group may be varied as desired by changing the speed at which the cam wheel 56 is rotated relatively to the cam wheel 42. In the construction shown the speed at which the cam wheel 56 is rotated may be varied as desired by changing the size of the pinion 62, the shaft of which pinion is mounted in the bearing blocks 67 that are adjustably secured to the side frames 13 by the bolts 68.

It is important to provide means for maintaining a constant tension upon the apron 10 as the length of the upper run of the same is varied by the movement of the knife blade 32 towards and from the fixed roller 31. To this end in the construction shown the tensioning roller 34 above mentioned is supported by the auxiliary rocking levers 69 which levers are pivotally secured intermediate their ends to the side frames 13 by the shaft 70. The lower end of each lever 69 is connected to a rocking lever 52 by a link 71, the arrangement being such that as the levers 52 are actuated to move the knife blade 32 in the apron advancing position, the auxiliary lever 69 will be rocked in the opposite direction to slack off the apron 10. The links 71 are pivotally secured to the lower ends of the auxiliary lever 69 by the pivot pins 72 and provision is made for adjusting these pins lengthwise of the lever 69 to vary the length of the stroke imparted to the lever 69 by the levers 52. The desired tension may be placed upon the apron 10 by rotating the roller 39 one end of which is provided with a ratchet wheel 73 having the cooperating pawl 74 for holding the ratchet wheel in the desired position of adjustment.

In the construction shown the intermediate belt 12 serves to deliver the confections 15 to a coating machine 75 of any well known or preferred construction, and the confections 15 are delivered by the belt 12 to the coating machine belt 76, the arrangement being such that as the spaced groups of confections 15 pass through the coating machine 75 they will receive a coating of hot chocolate or other coating material. The coated confections 15 upon leaving the coating machine should be passed through a cooling chamber and they may therefore be delivered by the belt 76 directly to the trays 77 of a tray conveyer of any well-known or preferred construction. The present invention is not concerned with the means employed for gently transferring the coated confections from the belt 76 to trays 77 since various means to this end might be employed, and one satisfactory construction for this purpose is disclosed in the J. W. Greer Patent No. 1,571,052, above cited. The mechanism shown in Fig. 5 closely resembles in construction and operation the mechanism disclosed in such patent for transferring the confections from the belt 14 of the patent to the trays 32.

In the construction shown in Fig. 5 the trays 77 are advanced in a right-hand direction by the side chains 78 which pass around the sprockets 79, and the upper run of the conveyer belt 76 is supported at its delivery end by a small bar or roller 80. The conveyer belt 76 may be driven by the cooperating rollers 81, 82, and the conveyer belts 12 and 76 should be driven in timed relation with the movement of the trays 78 so that each group of confections will be properly placed upon a tray and the spaces between adjacent groups of confections will correspond with the spaces between adjacent trays. The intermediate belt 12 is preferably driven from an operating part of the coating machine 75 by the chains 83 and 84 (see Fig. 1).

As above pointed out the transferring apron 10 may be located at various points along the series of conveyer belts employed, but in most cases it will be found desirable to place the transferring mechanism between the depositing machine and the coating machine, so that the confections will be properly spaced upon entering the coating machine. This makes it unnecessary for the transferring mechanism 10 to handle the freshly coated confections.

From the foregoing description when read in connection with the drawings it will be seen that the transferring apron 10 is gradually advanced along the belt 12 as the successive rows of confections are transferred from one belt to the other, and that when a sufficient number of rows have been transferred to form a group of the desired size the apron is quickly retracted to form the desired gap between successive groups of confections.

While other forms of mechanism than that shown may be employed to operate the transferring apron 10, the present construction whereby the ends of the apron are secured to a rocking frame is desirable as it insures positive movement of the apron in timed relation with the other parts of the machine and transfers the confections from one belt to the other without injuring or marring them. Furthermore, the reciprocatory movement imparted to this apron cooperates well with the step-by-step feed movement imparted to the depositor apron 11.

What is claimed is:—

1. In a device of the class described, in combination, a pair of conveyers, means for transferring articles from one conveyer to the other and for arranging them in spaced groups upon the second conveyer, comprising a transferrer for transferring the articles from one conveyer to the other, and means for progressively increasing the distance the articles are moved by the transferrer to thereby arrange them in spaced groups upon the second conveyer.

2. In a device of the class described, in combination, a pair of conveyers, means for transferring articles from one conveyer to the other and for arranging them in spaced groups upon the second conveyer, comprising a reciprocatory transferrer for transferring the articles from one conveyer to the other, and means for moving the active portion of the transferrer progressively increasing distances to effect grouping of the articles in spaced groups upon the second conveyer.

3. In a device of the class described, in combination, a pair of endless conveyers, means for transferring articles from one conveyer to the other and for arranging them in spaced groups upon the second conveyer, comprising a transferrer for transferring the articles from one conveyer to the other, and means for automatically varying the distance the articles are moved by the transferrer to arrange them in spaced groups upon the second conveyer.

4. In a device of the class described, in combination, a conveyer adapted to advance articles placed on the conveyer in spaced relation to each other, a second conveyer, a transferrer for transferring the spaced articles from the first to the second conveyer, means for imparting a reciprocatory movement to the transferrer to transfer the articles from one conveyer to the other, and means for advancing the active portion of the transferrer successively increasing distances along the second conveyer to cause it to deposit the articles on the second conveyer in successive groups that are separated by a space.

5. In a device of the class described, in combination, a pair of conveyers, a transferrer between the adjacent ends of the conveyers for transferring articles from one conveyer to the other, and means for varying the distance the articles are moved by the transferrer to thereby arrange them in spaced groups upon the second conveyer.

6. In a device of the class described, in combination, a pair of conveyers, means for transferring articles from one conveyer to the other and for arranging them in spaced groups upon the second conveyer, comprising a transferrer for transferring articles from one conveyer to the other, and means for operating the transferrer to advance successive articles increased distances throughout a predetermined cycle of operations to thereby arrange the articles in spaced groups upon the second conveyer.

7. In a device of the class described, in combination, a pair of conveyers, means for transferring articles from one conveyer to the other and for arranging them in spaced groups upon the second conveyer, comprising a transferrer, and means for advancing the active portion of the transferrer successively increasing distances throughout the transfer of one group of articles to the second conveyer and adapted to then return said active portion of the transferrer to its initial position.

8. In a device of the class described, in combination, a pair of conveyers, means for transferring articles from one conveyer to the other and for arranging them in spaced groups upon the second conveyer, comprising a transferrer, means for advancing the active portion of the transferrer successively increasing distances along the second conveyer throughout the transfer of a group of articles to the second conveyer, and means for returning the active portion of the transferrer quickly to its original position preparatory to transferring the next group of articles.

9. In a device of the class described, in combination, a pair of conveyers, means for transferring articles from one conveyer to the other and for arranging them in spaced groups upon the second conveyer, comprising a traveling apron having a portion extending over said second conveyer, and means for slowly advancing the leading portion of the apron over the second conveyer during the transfer of a group of articles and then returning said leading portion quickly to its initial position.

10. In a device of the class described, in combination, a pair of conveyers, means for transferring articles from one conveyer to the next and for arranging them in spaced groups upon the second conveyer, comprising, an apron-supporting bar positioned above said second conveyer, an apron supported by said bar, means for moving the bar and the active portion of the apron progressively increasing distances lengthwise of said second conveyer to effect the grouping of the articles, and means for moving the apron back and forth to advance rows of articles from one conveyer to the other.

11. In a device of the class described, in combination, a pair of endless conveyers, means for transferring articles from one conveyer to the other and for arranging them in spaced groups upon the second conveyer, comprising a traveling apron arranged between said conveyers, and means for slowly advancing the leading portion of said apron over the second conveyer during the transfer of a group of articles and operable to return said leading portion quickly to its initial position.

12. In a device of the class described, in combination, a pair of endless conveyers, means for transferring articles from one conveyer to the other and for arranging them in spaced groups upon the second conveyer, comprising an apron disposed between said conveyers, means for advancing the delivery end portion of said apron longitudinally of the second conveyer to produce spaces between successive groups of the articles, and means for moving the apron back and forth with a reciprocatory movement to advance the articles from one conveyer to the other.

13. In a device of the class described, in combination, a pair of conveyers, a transferrer for transferring articles from one conveyer to the other including an apron, means for advancing the delivery portion of said apron different distances along the second conveyer to facilitate the formation of a space between adjacent groups of articles, and rocking means to which the ends of the apron are secured and operable to actuate the apron with a positive reciprocatory movement.

14. In a device of the class described, in combination, a pair of conveyers, a transferrer for transferring articles from one conveyer to the other including an apron, means for moving the apron back and forth with a reciprocatory movement to carry the articles from one conveyer to the other, and means for advancing the apron slowly along the second conveyer throughout a predetermined cycle of movements and then returning it to its original position to effect the formation of a space between adjacent groups of the articles.

15. In a device of the class described, in combination, a confectionery conveyer belt adapted to advance confections placed thereon in uniformly spaced relation, a second confectionery conveyer belt, and a bunching and spacing device positioned to transfer the confections from the first to the second conveyer, comprising a traveling apron, means for advancing the leading portion of the apron along the second conveyer to deposit the confections thereon and in closer relation to each other than they are placed on the first conveyer, and means for periodically moving the leading portion of the apron in the reverse direction to form a gap between successive groups of the confections.

16. In a device of the class described, in combination, a pair of conveyers, an apron for transferring articles from one conveyer to the other, a rocking frame to which the opposite ends of the apron are secured, means for rocking the frame to shift the apron back and forth with a reciprocatory movement to advance the articles from one conveyer to the other, a bar about which the leading portion of the apron is looped, and means for advancing the bar and leading portion of the apron slowly in one direction and rapidly in the opposite direction along the second conveyer to deposit the articles thereupon in spaced groups.

17. In a device of the class described, in combination, a pair of conveyers, a transferrer for transferring articles from one conveyer to the other including an apron, means for actuating the apron to advance the articles, a bar for supporting the leading portion of the apron, levers for operating said bar to advance the leading portion of the apron along the second conveyer to deposit the confections thereon in spaced groups, and take-up means for maintaining a constant tension on said apron including auxiliary levers mounted to be rocked in the reverse direction by the movement of the first mentioned levers.

18. In a device of the class described, in combination, a pair of conveyers, a transferrer, for transferring articles from one conveyer to the other including an apron, means for operating the apron to effect the transfer of the articles from one conveyer, a bar for supporting the leading portion of said apron, levers for moving said bar lengthwise of the second conveyer to shift the apron so that it will deposit the articles upon the second conveyer in spaced groups, and cam means for positively rocking the levers slowly in one direction and rapidly in the opposite direction.

19. In a device of the class described, in combination, a pair of conveyers, a transferrer for transferring articles from one conveyer to the other including an apron, means for operating the apron to effect the transfer of the articles from one conveyer, a bar for supporting the leading portion of said apron, levers for moving said bar lengthwise of the second conveyer to shift the apron so that it will deposit the articles upon the second conveyer in spaced groups, cam means for positively rocking the levers slowly in one direction and rapidly in the opposite direction, and tension take-up means actuated by the movement of said levers to maintain a constant tension upon said apron.

In testimony whereof, I have signed my name to this specification.

JESSE W. GREER.